(12) United States Patent
Koning et al.

(10) Patent No.: US 8,612,660 B2
(45) Date of Patent: Dec. 17, 2013

(54) INTERRUPT LATENCY MEASUREMENT

(75) Inventors: Maarten Koning, Bloomfield (CA);
Tomas Evensen, Foster City, CA (US)

(73) Assignee: Wind River Systems, Inc., Alameda, CA (US)

( * ) Notice: Subject to any disclaimer, the term of this patent is extended or adjusted under 35 U.S.C. 154(b) by 342 days.

(21) Appl. No.: 13/044,137

(22) Filed: Mar. 9, 2011

(65) Prior Publication Data

US 2012/0233367 A1   Sep. 13, 2012

(51) Int. Cl.
*G06F 13/24* (2006.01)
*G06F 17/50* (2006.01)
*G06F 9/45* (2006.01)

(52) U.S. Cl.
USPC ............. 710/262; 710/260; 710/267; 703/19; 703/22

(58) Field of Classification Search
USPC ......... 710/260–267; 702/187; 703/13, 19, 21, 703/22–23, 28
See application file for complete search history.

(56) References Cited

U.S. PATENT DOCUMENTS

| 5,944,840 | A  | * | 8/1999  | Lever ............................. 714/34 |
| 6,105,145 | A  | * | 8/2000  | Morgan et al. ................ 713/501 |
| 6,526,370 | B1 | * | 2/2003  | Yu et al. ......................... 702/182 |
| 6,973,417 | B1 | * | 12/2005 | Maxwell et al. ................... 703/2 |
| 2004/0236534 | A1 | * | 11/2004 | Wheless et al. ............... 702/127 |
| 2005/0010707 | A1 | * | 1/2005  | Francis ......................... 710/260 |

* cited by examiner

*Primary Examiner* — Thomas J Cleary
(74) *Attorney, Agent, or Firm* — Fay Kaplun & Marcin, LLP

(57) ABSTRACT

A system and method for setting a first indicator indicating that interrupts are virtually locked, receiving a first interrupt at a processor of a computing device, setting a second indicator indicating the receipt of the first interrupt and recording a first timestamp based on the receipt of the first interrupt. The system and method further adapted to virtually execute a routine for the first interrupt that includes determining if the second indicator is set, record a second timestamp based on the virtual execution of the routine and determine an interrupt latency based on the first and second timestamp.

18 Claims, 2 Drawing Sheets

INTERRUPT LATENCY MEASUREMENT

BACKGROUND

An interrupt may be an asynchronous signal indicating a need for attention or a synchronous event in software indicating a need for a change in execution. Thus, to ensure an optimum performance of an operating system, the processing of interrupts requires knowledge of an interrupt latency that is time based. The interrupt latency for operating systems may be measured to determine a time between a generation of the interrupt by a device and a servicing of the device that generated the interrupt. Often, devices are serviced as soon as the device's interrupt handler is executed. A callback subroutine for the interrupt handler of the operating system or a device driver may be triggered by the reception of the interrupt. However, the functionality of the interrupt handler is varied as a function of the reason for the interrupt and the speed at which the interrupt handler completes its task.

Conventional means for measuring the interrupt latency requires expensive and/or cumbersome external hardware. For example, an oscilloscope may be included to enable an observation of constantly varying signal voltages to determine the interrupt latency. In another example, a logic analyzer may be included to display signals of a digital circuit which are too fast to be observed and presents the signals for observation for a device under test. Additional hardware such as those described above are required in conventional measuring systems to measure interrupt latency for non-periodic interrupt sources or other interrupt sources that have an interrupt signal assertion time that cannot be predicted.

SUMMARY OF THE INVENTION

A method for setting a first indicator indicating that interrupts are virtually locked, receiving a first interrupt at a processor of a computing device, setting a second indicator indicating the receipt of the first interrupt and recording a first timestamp based on the receipt of the first interrupt. The method further adapted to virtually execute a routine for the first interrupt that includes determining if the second indicator is set, record a second timestamp based on the virtual execution of the routine and determine an interrupt latency based on the first and second timestamp.

A computing device having a hardware component generating an interrupt, a processor executing an operating system configured to receive the interrupt and measure a latency of the interrupt for the hardware component by virtually executing the interrupt and a memory storing latency data.

A non-transitory computer readable storage medium including a set of instructions executable by a processor. The set of instructions operable to set a first indicator indicating that interrupts are virtually locked, receive a first interrupt at a processor of a computing device, set a second indicator indicating the receipt of the first interrupt, record a first timestamp based on the receipt of the first interrupt, virtually execute a routine for the first interrupt that includes determining if the second indicator is set, record a second timestamp based on the virtual execution of the routine and determine an interrupt latency based on the first and second timestamp.

DETAILED DESCRIPTION

Figure 1:
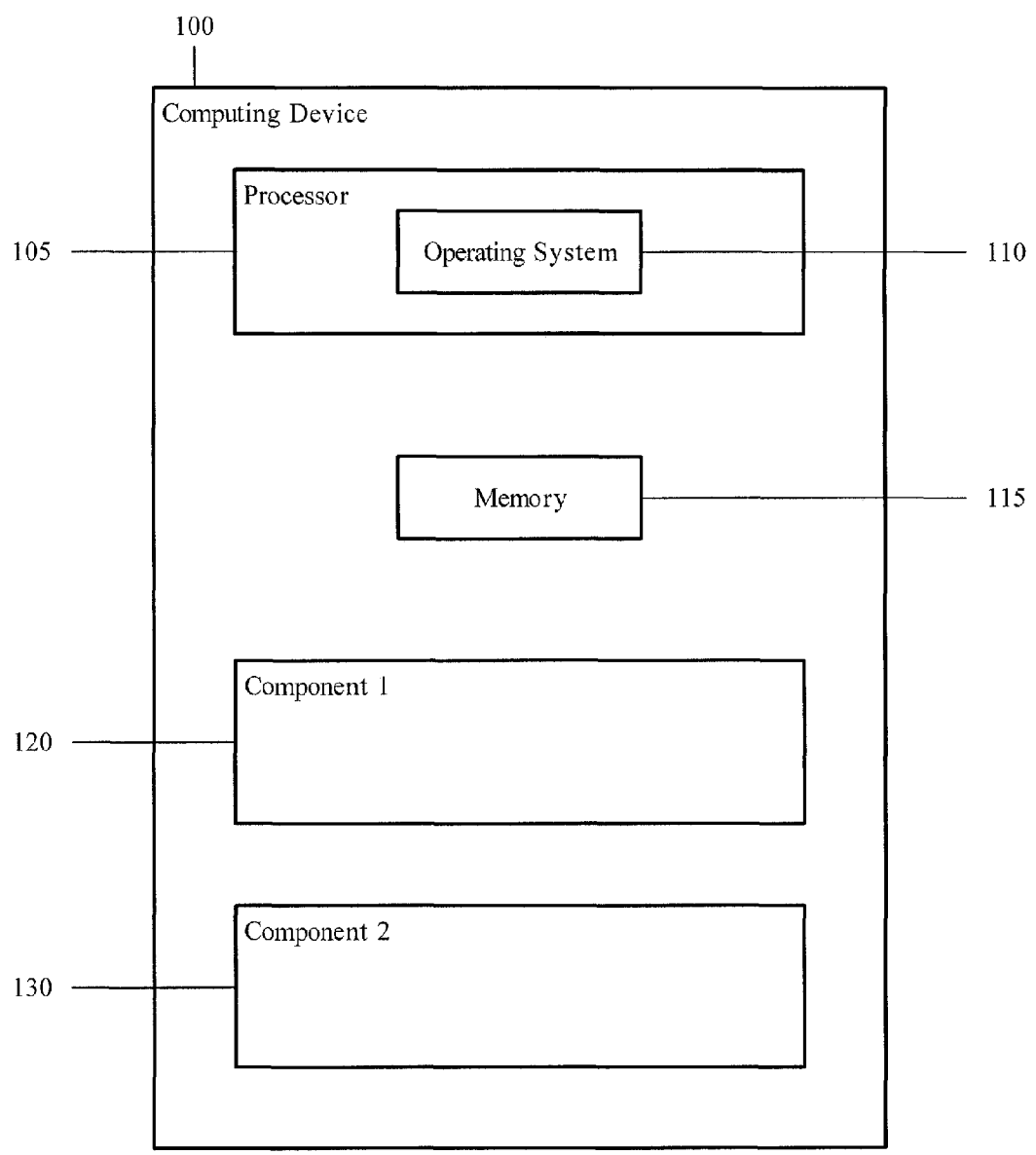
FIG. 1 shows a computing device according to an exemplary embodiment.

The exemplary embodiments may be further understood with reference to the following description and the appended drawings, wherein like elements are referred to with the same reference numerals. The exemplary embodiments describe a computing device configured to measure interrupt latency without the use of additional hardware component(s). Specifically, only software in the form of the operating system of the computing device is used to measure the interrupt latency and for any interrupt source (e.g., asynchronous signal, synchronous event, non-periodic source, unpredicted interrupt signal assertion source, etc.). The computing device, interrupt latency, the measurement, the software, the interrupt source, and an associated method with be discussed in further detail below.

FIG. 1 shows a computing device 100 according to an exemplary embodiment. The computing device 100 may be any electronic device that is configured to perform various computational functionalities. For example, the computing device 100 may be a desktop computer, a mobile device (e.g., a laptop, a personal digital assistant, a cellular phone, etc.) or an embedded device (e.g., camera, automobile, thermostat, etc.). The computing device 100 is further configured to determine an interrupt latency without the need of further hardware components. That is, external or internal hardware is not required as the interrupt latency may be determined using software already present on the computing device 100. The computing device 100 may include a processor 105, a memory 115, a first component 120, and a second component 130. However, it should be noted that the computing device 100 may include further components that provide additional functionalities.

The processor 105 and the memory 115 may provide conventional functionalities for the computing device 100. The computing device 100 may include an operating system 110. The operating system 110 may be software stored on the memory 115 and executed by the processor 105. The operating system 110 may also provide conventional functionalities. For example, the operating system 110 may be VxWorks, Linux, Windows, etc.

The components 120, 130 may be any hardware that is incorporated with the computing device 100. For example, the components 120, 130 may be a data input device (e.g., keypad), a network card, a video card, a sound card, etc. Those skilled in the art will understand that a hardware component of the computing device 100 may further include associated software components such as a device driver. Thus, to call a functionality of the hardware component, the device driver may be associated according to the settings of the operating system 110.

According to the exemplary embodiments, the operating system 110 may be configured or modified with a program or executable that performs the measurement of the interrupt latency. That is, the exemplary embodiments may utilize all existing hardware and software of the computing device 100 to measure the interrupt latency. Thus, for example, if a functionality of the component 120 is being called, the component 120 may transmit an interrupt to the processor 105. To determine the interrupt latency, the operating system 110 may perform an algorithm associated therewith.

As described above, the operating system 110 may be configured to measure an interrupt latency. According to the exemplary embodiments, the interrupt latency may be determined using a preliminary process performed prior to the interrupt being executed. Specifically, the operating system 110 may include virtual processes that are performed.

Initially, the operating system 110 may include routines that are associated with performing an interrupt operation. For example, the operating system 110 may include an interrupt locking routine. Conventionally, the interrupt locking routine is invoked when the OS software does not want to be interrupted by an interrupt service routine ("ISR"). However, according to the exemplary embodiments, the interrupt locking routine does not lock interrupts at this stage but simply sets a flag X that indicates that interrupts are virtually locked. A timestamp A may also be recorded. Thus, in an exemplary embodiment, the flag X is set when the interrupt locking routine virtually locked interrupts.

Subsequently, when an interrupt on the processor 105 occurs, a determination is made whether the flag X has been set. For example, the component 120 may send an interrupt to the processor 105. If the flag X has been set, the operating system 110 may set a second flag Y that indicates that an interrupt has occurred. Data relating to the interrupt event may be stored. In the example, the interrupt data may relate to the component 120, the functionality that is to be called, a priority level of the interrupt, etc. A second timestamp B may be recorded at this time. A modified virtual lock of interrupts may be performed so that when the interrupt context returns for the interrupt to finally be executed, the interrupts may be locked. That is, due to the additional process of measuring the interrupt latency at this stage between the interrupt occurring and the interrupt being executed, the modified interrupt lock may alter the execution of the interrupt, in particular the locking of interrupts. This step may ensure that the interrupt is properly performed without requiring additional steps such as forcing a second interrupt from the same source to be sent.

It is noted that an interrupt handler is not initiated at this time. When the interrupt occurs, interrupts are locked and the interrupt handler is executed to perform the interrupt. However, despite the interrupt occurring, interrupts have been virtually locked. Furthermore, it is noted that the second interrupt not being required is only exemplary. As will be described below, different processes may be used to eventually perform the interrupt.

Because the operating system 110 is reading that interrupts are locked because the flag Y is set, the operating system 110 is aware that an interrupt has occurred. Accordingly, an interrupt unlocking routine may check whether the flag Y was set to determine that the interrupt occurred while interrupts were locked. The operating system 110 may note and/or record a timestamp C at this point. The operating system 110 may then measure the actual hardware interrupt latency by taking a difference between the timestamps B and C.

Once the interrupt latency has been measured, the interrupt handler may be executed from the context that was saved previously. As discussed above, the interrupt context is returned and the conventional processes involved with performing the interrupt may occur such as an actual locking of interrupts. In an alternative process, the interrupt handler associated with the deferred interrupt event may be run after interrupts are unlocked by letting the hardware reassert the interrupt. Thus, the interrupt may occur again at the processor 105 without performing the measurement of the interrupt latency. To prevent a loop from occurring, the operating system 110 may record the measurement of the interrupt latency with a marker or other indication that indicates that the measurement should not be performed again for this interrupt. The markers may be used per nested interrupts.

Figure 2:
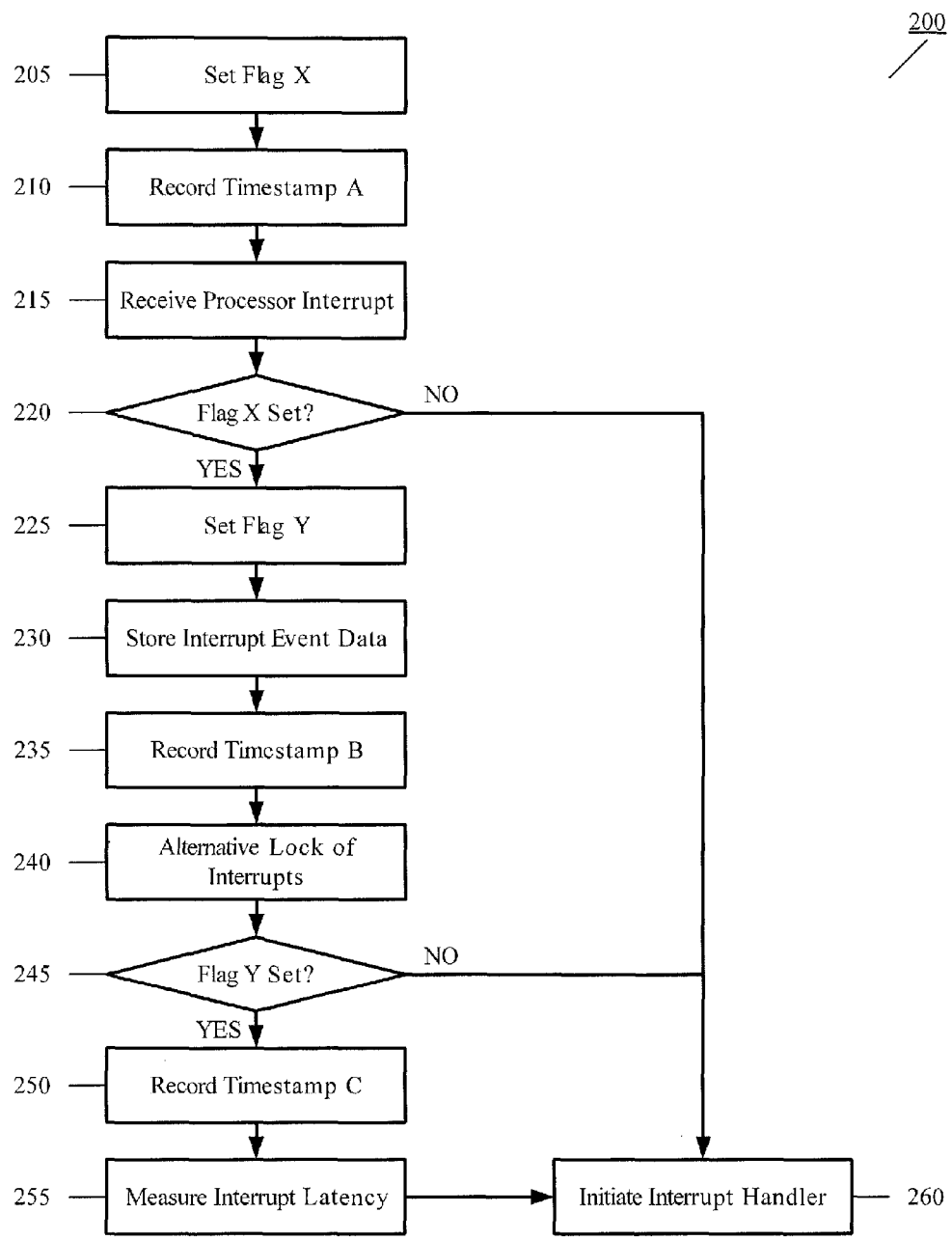
FIG. 2 shows a method for measuring interrupt latency according to an exemplary embodiment.

FIG. 2 shows a method 200 for measuring interrupt latency according to an exemplary embodiment. As discussed above, the measuring of the interrupt latency may be performed using only existing hardware and software of a computing device. Specifically, the operating system of the computing device may be modified to determine the measurement. The method 200 will be described with reference to the computing device 100 of FIG. 1.

In step 205, the operating system 110 sets a flag X to indicate that interrupts are virtually locked. As discussed above, the interrupt lock routine of the operating system 110 may perform the setting. In step 210, the timestamp A is recorded.

In step 215, the interrupt may occur for the processor 105. for example, the component 130 may send the interrupt when a functionality of the component 130 is called. In step 220, a determination is made whether the flag X has been set. If the flag X has not been set, the method 200 continues to step 260 where the interrupt handler is initiated. As discussed above, if the interrupt latency has already been measured, the hardware may be reset and the interrupt may be reasserted by the component. As a result, the flag X may not be set.

If the flag X has been set, the method 200 continues to step 225. In step 225, the operating system sets the flag Y that indicates the interrupt has occurred. In preparation for the eventual execution of the interrupt, in step 230, the interrupt event data is stored. As discussed above, the interrupt event data may include component data, functionality data, priority data, etc. In step 235, the timestamp B is recorded to indicate the occurrence of the interrupt as though the virtual execution of the interrupt has not occurred to accurately determine the interrupt latency.

In step 240, the operating system 110 performs a modified lock of interrupts to prevent the operating system 110 from receiving a further interrupt. As discussed above, this modified lock may be used when the interrupt context is used for the eventual execution of the interrupt. Thus, when the interrupt context is returned, an actual lock of interrupts is performed.

In step 245, a determination is made whether the flag Y has been set. If the flag Y has not been set, the method 200 continues to step 260 where the interrupt handler is initiated. If the flag Y has been set, the method 200 continues to step 250 where the timestamp C is recorded. The timestamp C may indicate a time when the interrupt has been completed were the virtual execution of the interrupt not have occurred. Thus, in step 255, the operating system 110 measures the interrupt latency by taking the difference between the timestamps B and C. Subsequently, in step 260, the interrupt handler is initiated.

It should be noted that the method 200 may include further steps. For example, after step 260, the method 200 may include a step that retrieves the stored interrupt context. As discussed above, when this occurs, the modified lock may then performing an actual lock of interrupts in preparation for executing the lock.

It should also be noted that the measuring of the interrupt latency according to the exemplary embodiments being the difference between the timestamps B and C is only exemplary. The operating system may further determine a relative range of interrupt latency measurements. For example, the interrupt latency may be determined to be a minimum when the difference between the timestamps B and C is performed. In another example, the interrupt latency may be determined to be a maximum when the different between the timestamps A and C is performed.

The exemplary embodiments provide a means to measure interrupt latency without a need for additional hardware components. Conventional measuring of interrupt latency requires the use of additional hardware components that are cumbersome and increases costs. The exemplary embodiments enable an existing operating system of a computing device to be configured to measure the interrupt latency. Specifically, an algorithm, a protocol, a program, etc. may be included with the operating system so that if interrupt latency is to be measured, the operating system may perform a preliminary virtual execution of an interrupt to measure the interrupt latency prior to the actual execution of the interrupt.

The exemplary embodiments include various steps of setting flags and recording timestamps to measure the interrupt latency. When detecting flags that are set, the operating system may view the interrupt actually being executed from virtual locking of interrupts to measure the interrupt latency. A stored interrupt context may be used after the interrupt latency is measured for the actual execution of the interrupt by an interrupt handler. Alternatively, the hardware may also be reset to reassert the interrupt and execute the interrupt without setting flags to bypass the measuring of the interrupt latency.

Those skilled in the art will understand that the above described exemplary embodiments may be implemented in any number of manners, including, as a separate software module, as a combination of hardware and software, etc. For example, the modification to the operating system may be a program containing lines of code that, when compiled, may be executed on the processor 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   setting a first indicator indicating that interrupts are virtually locked;
   receiving a first interrupt at a processor of a computing device;
   setting a second indicator indicating the receipt of the first interrupt, when the first indicator indicates that interrupts are virtually locked;
   recording a first timestamp based on the receipt of the first interrupt;
   virtually executing a routine for the first interrupt that includes determining if the second indicator is set;
   recording a second timestamp based on the virtual execution of the routine; and
   determining an interrupt latency based on the first and second timestamp.

2. The method of claim 1, wherein the first interrupt is one of asynchronous, non-periodic, and unpredicted.

3. The method of claim 1, further comprising:
   recording a third timestamp when the first indicator is set.

4. The method of claim 3, further comprising:
   determining a maximum interrupt latency based on the second and third timestamp.

5. The method of claim 1, further comprising:
   storing information describing the first interrupt.

6. The method of claim 5, further comprising:
   performing an execution of the first interrupt using the stored information describing the first interrupt.

7. The method of claim 1, further comprising:
   locking the interrupts when the first interrupt is received.

8. The method of claim 1, further comprising:
   unlocking the interrupts after the virtual execution of the interrupt.

9. The method of claim 8, further comprising:
   receiving a second interrupt after the interrupts have been unlocked, wherein the second interrupt corresponds to the first interrupt; and
   executing the second interrupt.

10. A computing device, comprising:
    a hardware component generating an interrupt;
    a processor executing an operating system configured to receive the interrupt, determine whether interrupts are virtually locked, virtually execute the interrupt when interrupts are virtually locked, and measure a latency of the interrupt for the hardware component by virtually executing the interrupt; and
    a memory storing latency data.

11. The computing device of claim 10, wherein the interrupt is one of asynchronous, non-periodic, and unpredicted.

12. The computing device of claim 10, wherein the operating system sets a first indicator for indicating that further interrupts are virtually locked and records a first timestamp for setting the first indicator.

13. The computing device of claim 12, wherein the operating system sets a second indicator for indicating the receiving of the interrupt when the first indicator is set.

14. The computing device of claim 13, wherein the operating system records a second timestamp upon setting the second indicator.

15. The computing device of claim 14, wherein the operating system records a third timestamp upon a completion of the virtual execution of the interrupt.

16. The computing device of claim 15, wherein the interrupt latency is measured as a different between the second timestamp and the third timestamp.

17. The computing device of claim 10, wherein the latency data includes an interrupt context used for an execution of the interrupt upon the measuring.

18. A non-transitory computer readable storage medium including a set of instructions executable by a processor, the set of instructions operable to:
    set a first indicator indicating that interrupts are virtually locked;
    receive a first interrupt at a processor of a computing device;
    set a second indicator indicating the receipt of the first interrupt, when the first indicator indicates that interrupts are virtually locked;
    record a first timestamp based on the receipt of the first interrupt;
    virtually execute a routine for the first interrupt that includes determining if the second indicator is set;
    record a second timestamp based on the virtual execution of the routine; and
    determine an interrupt latency based on the first and second timestamp.

* * * * *